(12) United States Patent
Potter et al.

(10) Patent No.: US 6,959,844 B2
(45) Date of Patent: Nov. 1, 2005

(54) VEHICLE ARTICLE CARRIER AND BRACKET ASSEMBLY

(75) Inventors: Donald R. Potter, Clarkston, MI (US); Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 393 days.

(21) Appl. No.: 10/401,308

(22) Filed: Mar. 27, 2003

(65) Prior Publication Data

US 2004/0188479 A1 Sep. 30, 2004

(51) Int. Cl.$^7$ .................................................. B60R 9/00
(52) U.S. Cl. ...................................... 224/321; 224/325
(58) Field of Search ................................ 224/321, 355

(56) References Cited

U.S. PATENT DOCUMENTS

| | | | |
|---|---|---|---|
| 4,469,261 A | * | 9/1984 | Stapleton et al. ............ 224/321 |
| 4,911,348 A | | 3/1990 | Rasor et al. |
| 4,982,886 A | * | 1/1991 | Cucheran ..................... 224/321 |
| 4,988,026 A | * | 1/1991 | Rasor et al. .................. 224/321 |
| 5,133,490 A | | 7/1992 | Cucheran |
| 5,579,970 A | * | 12/1996 | Cucheran et al. ............ 224/321 |
| 5,791,536 A | | 8/1998 | Stapleton |
| 5,947,356 A | * | 9/1999 | Delong ........................ 224/404 |

* cited by examiner

*Primary Examiner*—Tri M. Mai
(74) *Attorney, Agent, or Firm*—Harness Dickey & Pierce P.L.C.

(57) ABSTRACT

A vehicle article carrier apparatus adapted to be disposed on an outer body surface of a vehicle for supporting articles. The apparatus includes support rails secured to the outer body, a cross bar spanning the support rails, and bracket assemblies secured to the cross bar. The bracket assemblies are coupled to the support rails and include a lower locking clamp pivotally secured to the housing. The lower locking clamp rotates between an open position and a closed position and secures the bracket assembly to the support rail when in the closed position. The open position is approximately 180° from the closed position. A detail within the housing contacts a first face of the lower locking clamp in the open position and a second face of the lower locking clamp in the closed position, thus preventing the lower locking clamp from rotating more than 180° between the open and closed positions.

17 Claims, 3 Drawing Sheets

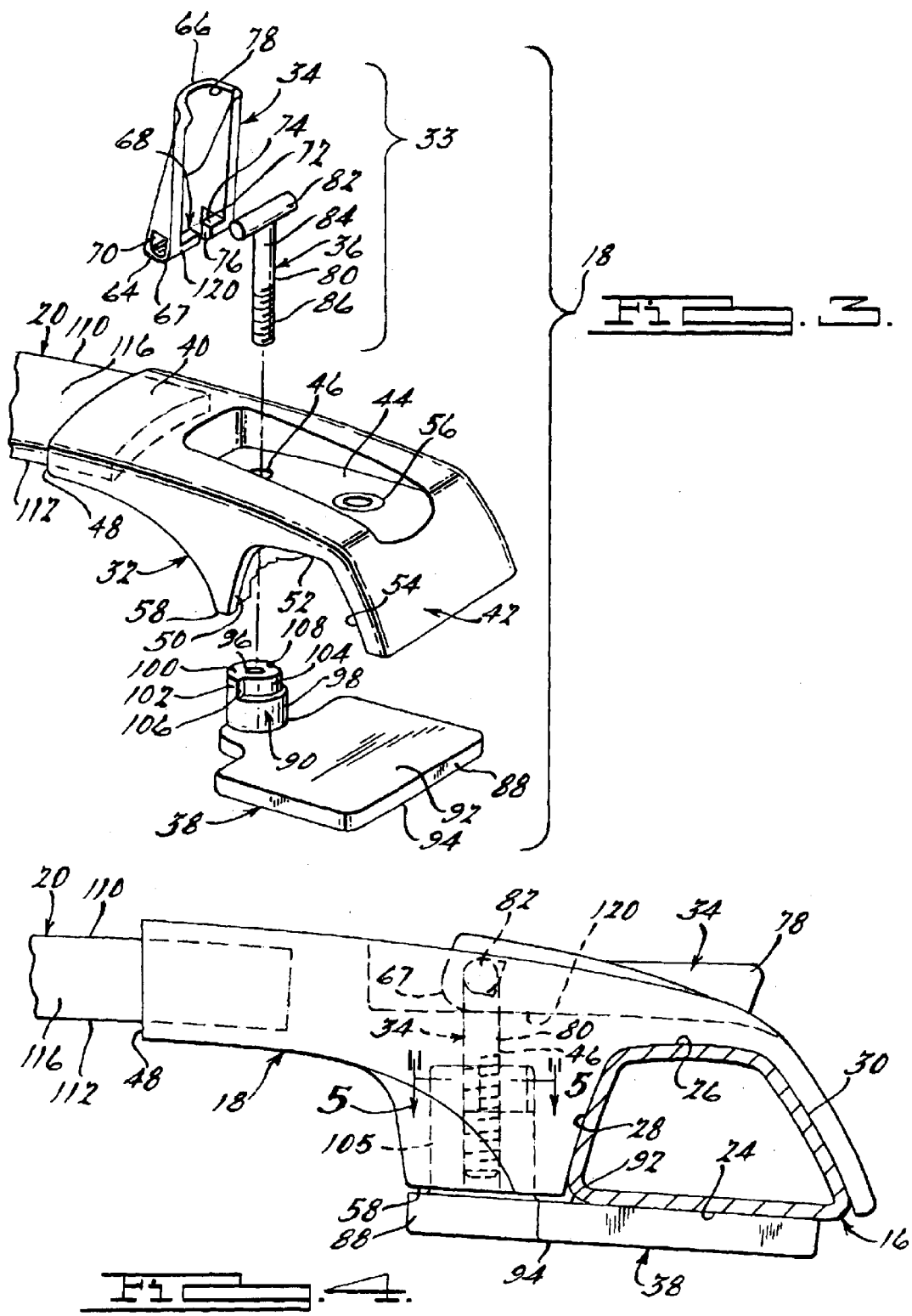

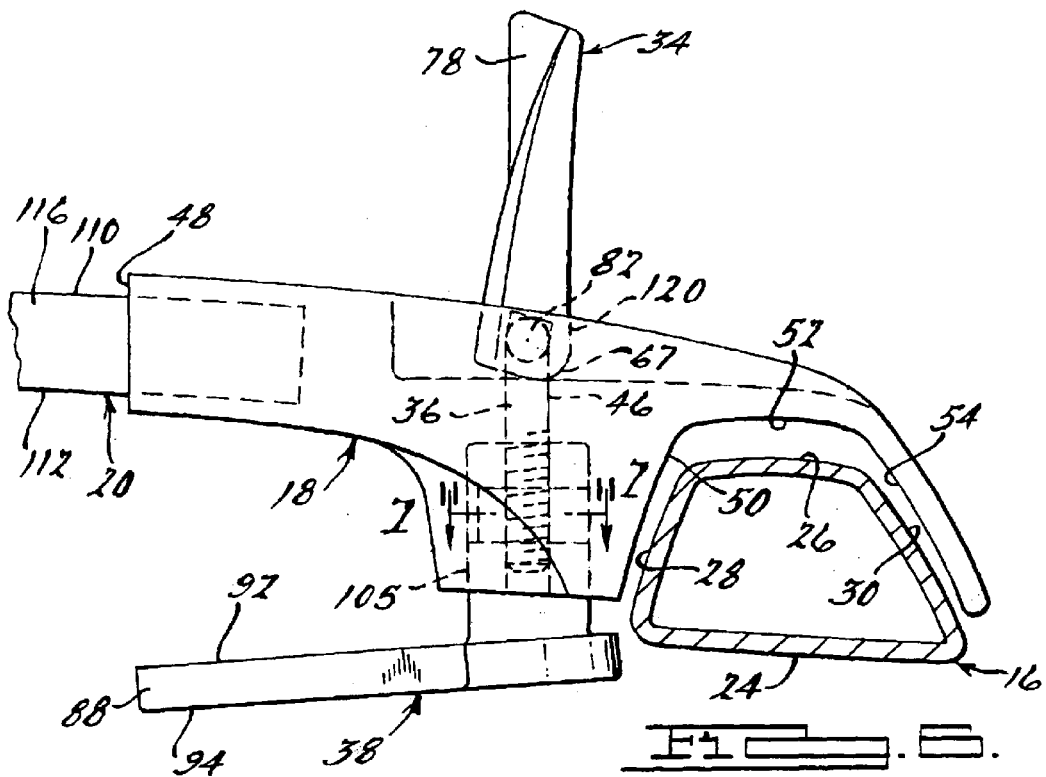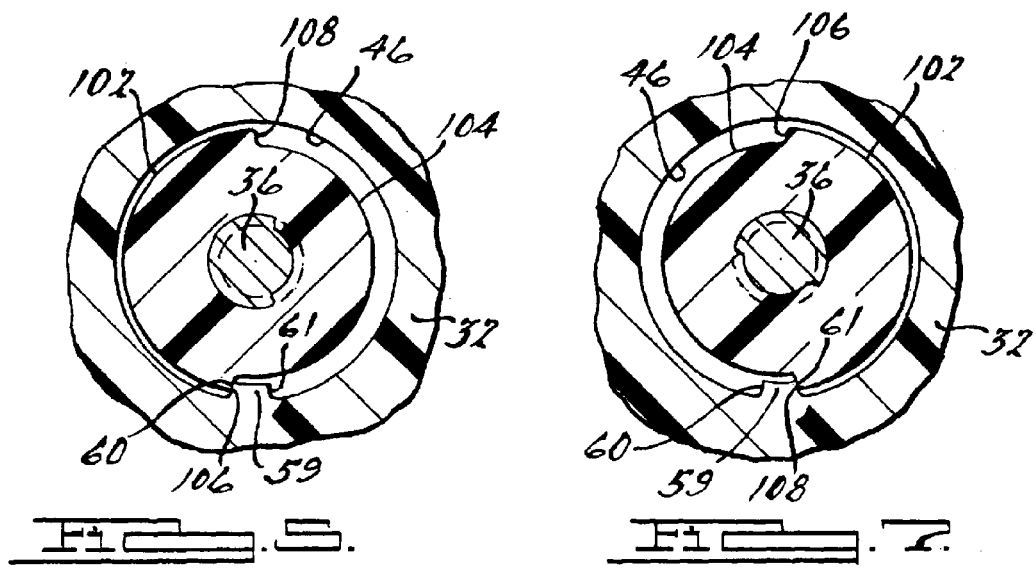

US 6,959,844 B2

VEHICLE ARTICLE CARRIER AND BRACKET ASSEMBLY

FIELD OF THE INVENTION

The present invention relates to vehicle article carriers. More particularly, the present invention relates to a vehicle article carrier having a bracket assembly with a simplified and improved locking mechanism.

BACKGROUND OF THE INVENTION

Vehicle article carriers are used in a wide variety of applications for supporting and securing articles of various sizes above an outer surface of a vehicle. Typically, vehicle article carriers include a pair of support rails that are secured to the outer body surface of the vehicle. The support rails are typically straight and mounted on the outer body surface to extend parallel to each other. The support rails are usually secured along a major longitudinal length of the vehicle roof, rear deck lid, or truck bed.

Typically, at least one cross bar extends between the two support rails. The cross bar is secured to each support rail by bracket assemblies that are fastened to each end of the cross bar. Each bracket assembly typically comprises a locking mechanism for releasably securing it to an associated one of the opposing support rails.

While current vehicle article carriers perform adequately for their intended use they are all subject to improvement. Specifically, the locking mechanisms of many current article carriers typically include a relatively large number of complex parts, thus making the locking mechanisms somewhat difficult and/or costly to assemble. Many such locking mechanisms require one or more independent springs to perform the needed locking action, which can add to the complexity and cost of the locking mechanism. Further, with some article carriers, the locking mechanisms can be difficult to completely disengage from their respective support rails when opened, and thereby prevent one or both of the bracket assemblies from being easily repositioned along its associated support rail or removed from the support rail.

Consequently, there exists a need for a vehicle article carrier having a cross bar with bracket assemblies at each end thereof that include a simplified locking mechanism that is easier to assemble, more cost efficient to produce, and provides excellent reliability in its locking orientation.

SUMMARY OF THE INVENTION

The present invention fulfills the needs of the prior art by providing a vehicle article carrier apparatus adapted to be disposed on an outer body surface of a vehicle for supporting various articles thereon. The apparatus includes support rails secured to the outer body, a cross bar spanning the support rails, and bracket assemblies secured to the ends of the cross bar. The bracket assemblies are coupled to the support rails and each includes a lower locking clamp pivotally secured to a housing of its respective bracket assembly. A locking lever rotates the lower locking clamp between an open position and a closed position. This secures the bracket assembly to the support rail when the locking lever is in the closed position due to a force applied to the support rails by the lower locking clamp. Once the lower locking clamp has been moved into the closed position, further rotation of the locking lever does not cause further rotation of the lower locking clamp, but does increase the force applied to the support rail by the lower locking clamp. The open position is approximately 180° from the closed position. A surface detail within the housing contacts a first face of the lower locking clamp, when the lower locking clamp is moved to the open position, thus preventing further rotation. A second face of the lower locking clamp contacts the surface detail when the locking clamp is moved to the closed position and thus prevents further rotation of the locking clamp once it is moved into the closed position. The structural detail thus prevents the lower locking clamp from rotating more than 180° between the open and closed positions. This enables the locking clamp to be moved between the full open and closed positions with just rotational movement of the locking lever. Once the locking lever is in its closed position and pre-tightened onto its associated support rail, then the locking lever can be pivoted from a first position, wherein it applies no additional clamping force, to a second position, wherein it applies an additional clamping force to even better secure the bracket assembly to its associated support rail.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exploded perspective view of a portion of a cross bar and one of the bracket assemblies of the apparatus of FIG. 1;

FIG. 4 is a side view of the assembled bracket assembly of FIG. 3 showing the bracket assembly in a closed position over a portion of its respective support rail;

FIG. 5 is a cross-sectional view taken along section line 5—5 in FIG. 4;

FIG. 6 is a side view of the bracket assembly of FIG. 4 but with the locking clamp in the fully open position; and FIG. 7 is a cross-sectional view taken along line section 7—7 in FIG. 6.

DETAILED DESCRIPTION OF THE PREFERRED EMBODIMENTS

The following description of the preferred embodiment is merely exemplary in nature and is in no way intended to limit the invention, its application, or uses.

Figure 1:
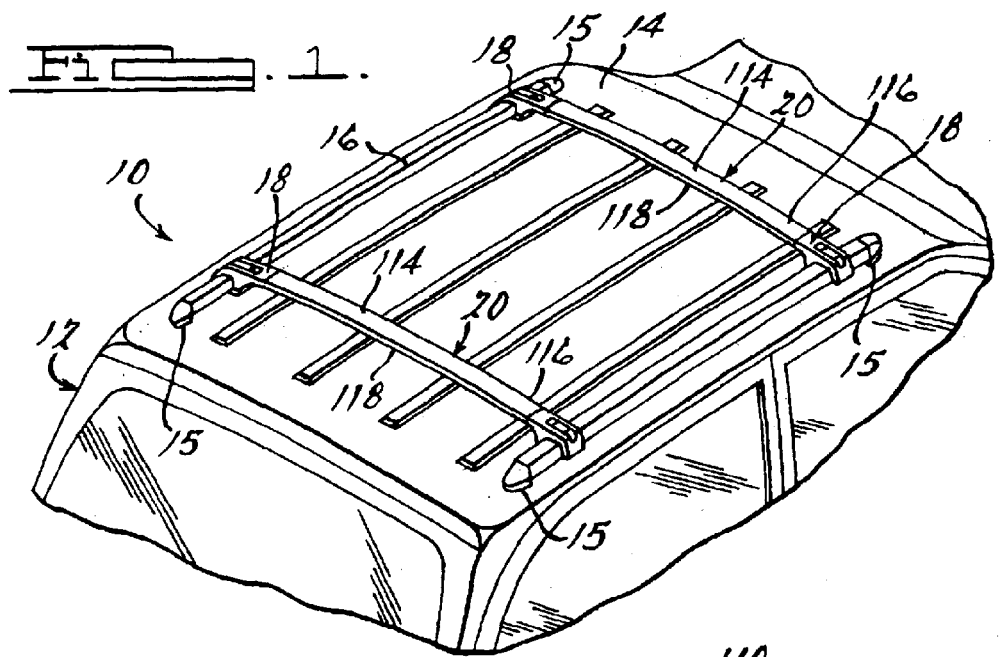
FIG. 1 is a perspective view of a portion of a vehicle including a vehicle article carrier apparatus in accordance with a preferred embodiment of the present invention.

Referring to FIG. 1, a vehicle article carrier apparatus 10 in accordance with a preferred embodiment of the present invention is illustrated. The article carrier apparatus 10 is shown installed on an exemplary motor vehicle 12. Specifically, the apparatus 10 is shown installed on a roof portion 14 of the motor vehicle 12. While FIG. 1 shows the apparatus 10 secured to the roof portion 14, it will be appreciated that the apparatus 10 can just as readily be secured at various other surfaces about an exterior of the motor vehicle 12. Further, the apparatus 10 is suitable for use on virtually any form of vehicle such as, but not limited to, a sport utility vehicle, station wagon, sedan, etc.

The apparatus 10 generally includes a pair of elongated support rails 16, at least two cross bar bracket assemblies 18, and at least one cross bar 20. It will be appreciated that in many applications two adjustably positionable cross bars 20 will be used, but that one of the cross bars 20 could just as readily comprise a fixed (i.e. non-movable) cross bar member. For the purpose of discussion and illustration, both of the cross bars 20 comprise adjustable cross bars.

Figure 2:
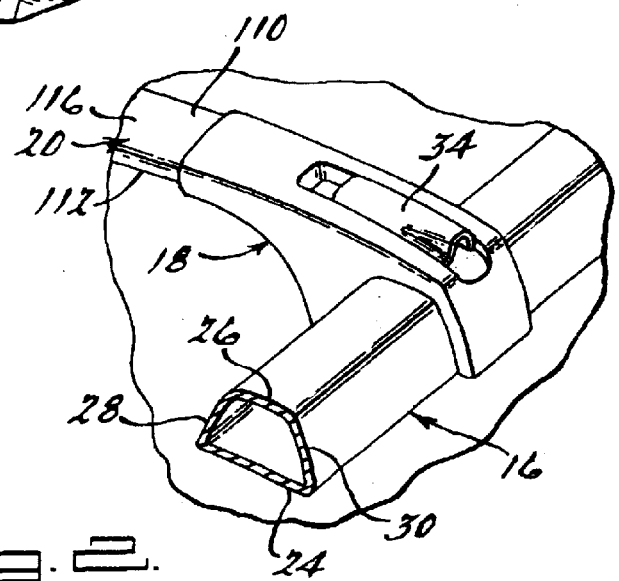
FIG. 2 is a perspective view of a portion of a cross bar, a portion of a support rail, and a bracket assembly of the apparatus of FIG. 1 in a closed position.

As illustrated in FIG. 1, the support rails 16 are placed in a generally parallel relationship along opposite sides of the roof 14. The support rails 16 are supported above the roof 14 by suitable support feet 15. FIG. 2 provides a more detailed view of one of the support rails 16, as well as the cross bar 20 and one of the bracket assemblies 18. As seen in FIG. 2, the support rail 16 is generally comprised of a lower rail surface 24, an upper rail surface 26, an inner rail surface 28, and an outer rail surface 30.

With reference to FIG. 3, the cross bar bracket assembly 18 will now be described in detail. It will be appreciated that the bracket assembly 18 at each end of the cross bar 20 is identical in construction. As seen in FIG. 3, the bracket assembly 18 is generally comprised of a housing 32, a locking lever assembly 33 having a locking lever 34 and a locking pin 36, and a lower locking clamp 38. The housing 32 generally includes a neck portion 40, a clamp portion 42, an upper recess 44 for receiving the locking lever 34, and a center through bore 46.

The neck portion 40 includes a hollow portion 48. The hollow portion 48 is shaped complementary to the cross bar 20 (described in detail below) so that the cross bar 20 may be seated securely within the hollow portion 48. The cross bar 20 is secured within the hollow portion 48 in any suitable manner, such as through the use of threaded fasteners (not shown) to provide a rigid connection between the cross bar 20 and the bracket assembly 18.

The clamp portion 42 includes an inner surface 50, an upper surface 52, and an outer surface 54. The shape of the inner surface 50, the upper surface 52, and the outer surface 54 complement the shape of the inner rail surface 28, the upper rail surface 26, and the outer rail surface 30 respectively so that the clamp portion 42 may sit firmly over the support rail 16. To cushion the interaction between the clamp portion 42 and the support rail 16, a rubber or other like pad (not shown) may be secured to the inner surface 50, the upper surface 52, and the outer surface 54.

The upper recess 44 is located on a surface of the housing 32 opposite the clamp portion 42. The recess 44 is of a depth and contour such that when the locking lever 34 is seated flat within the recess 44 (FIG. 2), the locking lever 34 does not protrude from the recess 44. The recess 44 preferably includes a bore 56 for receipt of an optional fastener (not shown) that cooperates with a similar bore (not shown) within the upper rail surface 26 to secure the bracket assembly 18 at a particular position on the support rail 16.

The center through bore 46 extends through the housing 32 from the recessed portion 44 to an undersurface 58 of the housing 32. As seen in FIGS. 5 and 6, the center through bore 46 includes a detail (i.e., rib or protrusion) 59 that protrudes from an interior wall of the center through bore 46. The detail 59 includes a first face 60 and a second face 61.

The locking lever 34 is an elongated lever having a first end 64 and a second end 66. The first end 64 includes a retention area 68 for receiving a portion of the locking pin 36, and a camming surface 67. The retention area 68 includes a first aperture 70 and a second aperture 72 within opposite sides of the lever 34. Between the first aperture 70 and the second aperture 72 is a well 74 having a center slit 76. The second end 66 preferably includes a raised portion 78 to permit easy actuation of the locking lever 34 by one or more fingers of an operator.

The locking pin 36 has a vertical shaft portion 80 and a head portion 82. The shaft portion 80 has a first end 84 and a second end 86. The second end 86 is threaded to threadly engage with the lower locking clamp 38. The head portion 82 is positioned at the first end 84 and is ninety degrees to the vertical shaft portion 80 to provide the locking pin 36 with a "T" shape.

The lower locking clamp 38 includes a planar support rail contact portion 88 and a boss surface portion 90. The support rail contact portion 88 has an upper surface 92 and a lower surface 94. The upper surface 92 is planar to complement the lower rail surface 24, which is also planar. The boss portion 90 extends from the upper surface 92 and is circular. Extending through the center of the boss portion 90 is a threaded through hole 96.

The boss portion 90 includes a lower circular base portion 98 and an upper portion 100. The upper portion 100 is comprised of a first semi-circular portion 102 and a second semicircular portion 104. The first semi-circular portion 102 has a diameter that is equal to the base portion 98. The second semi-circular portion 104 has a diameter that is less than the first semi-circular portion 102. Due to the difference in diameters between the first portion 102 and the second portion 104, a first face 106 and a second face 108 (see also FIG. 5) of the first semi-circular portion 102 are created.

With further reference to FIGS. 1 through 3, the cross bar 20 will now be described in detail. The cross bar 20 generally includes an elongated tubular, preferably oval shaped (in cross-section), member having a top portion 110, a bottom portion 112, a first outer most end 114, a second outer most end 116, and a central region 118. One of the bracket assemblies 18 is disposed at both the first outer most end 114 and the second outer most end 116 with a portion of both the first outer most end 114 and the second outer most end 116 secured within its respective hollow portion 48 of its respective bracket assembly 18.

FIGS. 4 and 5 illustrate the components of FIG. 3 as installed with the bracket assembly 18 in a closed position such that it is securely seated upon, and clamped to, one of the support rails 16. As seen in FIG. 4, in the closed position the locking lever 34 is seated horizontally within the upper recess 44. The head portion 82 of the locking pin 36 is seated within the retention area 68 such that the head portion 82 extends from the first aperture 70 to the second aperture 72. The vertical shaft portion 80 extends through the center slit 76. The locking pin 36 remains in the horizontal position as shown in FIG. 4 until an upward force is applied to the locking pin 36, due to an over-center locking action between a planar base portion 120 of the locking lever 34 and the recessed portion 44.

The vertical shaft portion 80 of the locking pin 36 extends through the center through bore 46 and is engaged within the threaded through hole 96. The locking pin 36 secures the entire boss portion 90 to the housing 32. The boss portion 90 is secured within an enlarged recess 105 and coaxially aligned with the through bore 46, as shown in FIG. 4. The boss portion 90 is secured within the recess 105 such that the detail 59 within the housing 32 is positioned between the first face 106 and the second face 108. In the closed position illustrated in FIG. 4 and FIG. 5, the lower locking clamp 38 is orientated such that the upper surface 92 of the support rail contact surface 88 abuts the lower rail surface 24. As seen in FIG. 5, when the lower locking clamp 38 is in the closed position the first face 106 of the first semi-circular portion 102 abuts the first face 60 of the detail 59 to limit rotational movement in one direction such that the lower locking clamp 38 is precisely positioned under the support rail 16. Thus, as the locking pin 36 is rotated in a first (i.e., tightening) direction, from an unclamped position, the lower locking clamp 38 moves initially into the clamped position and is then stopped by first face 60 from rotating further. The slight frictional engagement of the threaded portion of the second end 86 in contact with the threaded hole 96 provides for initial rotational movement of the lower locking clamp 38.

FIGS. 6 and 7 illustrate the components of FIG. 3 as installed with the bracket assembly 18 in an open position so that the bracket assembly 18 may be freely placed upon, or removed from, the support rail 16. In the open position the lower locking clamp 38 is positioned out from underneath the lower rail surface 24 (i.e., positioned 180° from its orientation of FIG. 4). The boss portion 90 of the locking clamp 38 is orientated such that the second face 108 of the first semi-circular portion 102 abuts the second face 61 of the detail 59 to hold the lower locking clamp 38 in the fully open position where the bracket assembly 18 can be easily lifted off of the support rail 16.

Movement of the bracket assembly 18 from the closed position of FIGS. 4 and 5 to the open position of FIGS. 6 and 7 will now be described in detail. The locking lever 34 is first lifted to its raised position as seen in FIG. 6. The locking lever 34 is lifted by the operator who preferably engages the raised portion 78 using his/her finger to lift the lever 34. This removes a portion of the clamping force applied by lever 34, locking pin 36 and lower locking clamp 38. Once the lever 34 is raised, the operator rotates the lever 34 180° (i.e., counterclockwise in FIG. 3) so that the lower locking clamp 38 is no longer positioned beneath the lower rail surface 24 (FIG. 4) but is rather clear of the lower rail surface 24 to permit the bracket assembly 18 to be removed from the support rail 16 (FIG. 6). Accordingly, the detail 59 stops rotation of the lower locking clamp 38 at a predetermined point where the bracket assembly can be lifted off.

To return the bracket assembly 18 to the closed position and secure the bracket assembly 18 to the support rail 16, the locking lever 34 is again rotated 180° (this time clockwise in FIG. 3). The support rail contact portion 88 of the lower locking clamp 38 is then initially moved underneath the support rail 16 and second face 108 of boss portion 90 abuts the detail 59. Once the lower locking clamp 38 is in position to abut the lower rail surface 24, the user may tighten the grip of the lower locking clamp 38 against the lower rail surface 24 by further rotating the locking lever 34 clockwise. As the lower locking lever 34 is rotated further, the contact between the second face 108 of the knob portion and the second face 61 of the detail 59 prevents the lower locking clamp 38 from rotating further, but permits the locking pin 36 to advance further into the threaded through hole 96. As the locking pin 36 is advanced further into the through hole 96, the lower locking clamp 38 is pulled upward toward, and into contact with, the lower rail surface 24 to thus further tightly clamp the bracket assembly 18 to the support rail 16. The locking lever 34 is then turned downward so that it is secured in a horizontal position within the recessed portion 44. The camming surface 67 and the over center action of the locking lever 34 maintains the locking lever 34 in the downward position, thus holding it in the locked position, while providing a small additional degree of clamping force over the support rail 16.

It will be appreciated however, that the open and closed positions could be set at less than 180° apart, depending on the width of the contact portion 88 and the positioning of the boss portion 90 thereon. However, generally at least a 90° range of movement will be required between the open and closed positions, with 180° being more preferred to ensure easy removal of the bracket assembly 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle article carrier apparatus adapted to be disposed on an outer body surface of a vehicle for supporting articles thereon, said apparatus comprising:

a pair of support rails adapted to be secured to said outer body surface in spaced apart relation to one another;

a cross bar having a length sufficient to substantially span a distance separating said support rails;

a pair of bracket assemblies secured to opposite ends of said cross bar, said bracket assemblies adapted to be coupled to a respective one of each of said support rails to suspend said cross bar member between said support rails, each of said bracket assemblies including:

a housing having a clamp portion for receiving at least one surface of one of said support rails;

a lower locking clamp pivotally secured to said housing, said lower locking clamp operable to rotate between an open position and a closed position relative to said support rail, said lower locking clamp applying a force to said support rail to secure said bracket assembly to said support rail when positioned in said closed position, said open position being at least approximately 90° from said closed position to permit said bracket assembly to be lifted off of its respective said support rail;

a locking lever assembly secured to said lower locking clamp for rotating said lower locking clamp between said open position and said closed position;

said locking lever assembly further being pivotable between a first position and a second position and operable to supply a tightening force upon said lower locking clamp, when said lower locking clamp is in said closed position, to draw said lower locking clamp toward said clamp portion and to increase said force applied by said lower locking clamp upon said support rail when moved from said first position into said second position.

a center through bore that extends through said housing and receives said lower locking clamp;

a detail located within said center through bore that cooperates with said lower locking clamp to prevent said lower locking clamp from rotating past said open position and past said closed position.

2. The vehicle article carrier apparatus of claim 1, wherein said lower locking clamp comprises a planar portion.

3. The vehicle article carrier apparatus of claim 1, wherein said lower locking clamp comprises:

a support rail contact portion; and a boss portion having a first face and a second face.

4. The vehicle article carrier apparatus of claim 3, wherein said first face contacts a first side of said detail when said lower locking clamp is in said closed position and said second face contacts a second side of said detail when said lower locking clamp is in said open position.

5. The vehicle article carrier apparatus of claim 1, wherein said locking lever assembly comprises a locking lever that is seated in a horizontal position within a recessed portion of said housing when not in use.

6. The vehicle article carrier apparatus of claim 1, wherein said locking lever further comprises a raised portion to receive one or more fingers of an operator to permit movement of said raised portion between a horizontal position and a vertical position.

7. The vehicle article carrier of claim 1, wherein said locking lever assembly comprises a locking lever pivotally secured to said housing that is movable rotationally about a first axis, and pivotally about a second axis transverse to said first axis.

8. The vehicle article carrier of claim 7, wherein said locking lever includes a camming surface for assisting in effecting an over center locking action when said locking lever is moved to said second position, to thus hold said locking lever in said second position.

9. A vehicle article carrier apparatus adapted to be disposed on an outer body surface of a vehicle for supporting articles thereon, said apparatus comprising:

a pair of support rails adapted to be secured to said outer body surface in spaced apart relation to one another;

a cross bar assembly having an overall length sufficient to span a distance separating said support rails, for supporting articles thereon;

said cross bar assembly including a pair of bracket assemblies at opposite ends of said cross bar assembly for engaging said support rails and supporting said cross bar assembly above said outer body surface, each said bracket assembly including:

a housing having a clamp portion for contacting at least one surface of a respective one of said support rails;

a locking lever assembly operably associated with said housing for locking said bracket assembly to said respective support rail;

said locking lever assembly having a locking lever and a locking pin operably coupled to one another;

a locking clamp threadably engaged with a threaded portion of said locking pin and movable from a first position, wherein said locking clamp is clear of said respective support rail allowing said bracket assembly to be removed from said respective support rail, to a closed position wherein said locking clamp is positioned adjacent to said respective support rail in position to be clamped thereto;

one of said housing and said clamping member including a structural detail defining a pair of spaced apart first surfaces, and the other of said housing and said clamping member including a pair of second surfaces, wherein said first and second surfaces limit rotational movement of said locking clamp to an arc of at least about 90 degrees, one end of said arc defining said open position for said clamping member and the other end of said arc defining a closed position for said clamping member;

wherein rotational movement of said locking lever assembly causes rotational movement of said locking clamp from said open position to said closed position;

wherein one pair of said first and second surfaces limits movement of said clamping member beyond said open position, and another pair of said first and second surfaces limits movement of said clamping member beyond said closed position; and wherein said locking lever is operable to be moved from a first, user accessible position, into a second, storage position on said housing and held in said second, storage position.

10. The vehicle article carrier of claim 9, wherein said locking lever is coupled to said housing to provide an over center locking action when moved between said first, user accessible position and said second, storage position.

11. The vehicle article carrier of claim 9, wherein said locking lever includes a camming surface that cooperates with said housing to provide an over center locking action when moved between said first, user accessible position and said second, storage position.

12. The vehicle article carrier of claim 9, wherein said locking clamp moves within an approximate 180 degree arc between said open and closed positions.

13. The vehicle article carrier of claim 9, wherein said clamping member includes a boss portion, and wherein said boss portion includes one of:

said structural detail; and said pair of second surfaces.

14. The vehicle article carrier of claim 9, wherein said housing includes said structural detail, and said locking clamp includes said pair of second surfaces.

15. The vehicle article carrier of claim 14, wherein said locking clamp is moved automatically from said open position to said closed position when said locking lever is rotated 180 degrees in a first rotational direction.

16. The vehicle article carrier of claim 9, wherein said locking pin is rotated about an longitudinal axis extending transversely of an axis around which said locking lever is moved.

17. The vehicle article carrier of claim 16, wherein said locking lever is coupled pivotally to said housing, and wherein said housing includes a recess within which said locking lever resides when said locking lever is placed in said second, storage position.

* * * * *